(12) United States Patent
Leigh (10) Patent No.: US 10,466,344 B2
(45) Date of Patent: Nov. 5, 2019

(54) HUMAN-COMPUTER INTERACTION APPLICATIONS OF PRECISE RANGING TECHNOLOGY AND GEOMETRIC DILUTION OF PRECISION IN A RANGING POSITIONING SYSTEM FOR VR

(71) Applicant: Tactual Labs Co., New York, NY (US)

(72) Inventor: Darren Leigh, Round Hill, VA (US)

(73) Assignee: Tactual Labs Co., New York, NY (US)

( * ) Notice: Subject to any disclaimer, the term of this patent is extended or adjusted under 35 U.S.C. 154(b) by 311 days.

(21) Appl. No.: 15/626,611

(22) Filed: Jun. 19, 2017

(65) Prior Publication Data

US 2018/0017670 A1 Jan. 18, 2018

Related U.S. Application Data

(60) Provisional application No. 62/359,518, filed on Jul. 7, 2016.

(51) Int. Cl.
| | |
|---|---|
| *G01S 11/02* | (2010.01) |
| *H04W 64/00* | (2009.01) |
| *H04W 12/10* | (2009.01) |
| *G01S 5/14* | (2006.01) |
| *H04L 29/06* | (2006.01) |

(52) U.S. Cl.
CPC .............. *G01S 11/02* (2013.01); *G01S 5/14* (2013.01); *H04L 63/107* (2013.01); *H04W 12/10* (2013.01); *H04W 64/003* (2013.01); *H04W 64/006* (2013.01); *G01S 2205/001* (2013.01)

(58) Field of Classification Search
CPC .......... G01S 11/02; G01S 5/14; H04L 63/107; H04W 12/10; H04W 64/003; H04W 64/006
USPC ........................................................ 342/386
See application file for complete search history.

(56) References Cited

U.S. PATENT DOCUMENTS

| | | | |
|---|---|---|---|
| 2012/0212374 A1* | 8/2012 | Kirby | G01S 5/021 342/451 |
| 2014/0253470 A1* | 9/2014 | Havilio | G06F 3/0412 345/173 |
| 2016/0306447 A1* | 10/2016 | Fleck | G06F 3/03545 |
| 2017/0364167 A1* | 12/2017 | Ribeiro | G06F 3/016 |

* cited by examiner

*Primary Examiner* — Harry K Liu
(74) *Attorney, Agent, or Firm* — Adam Landa (57) ABSTRACT

Two or more objects, or an object and an environment are each fitted with two or more range measurement devices. Each of the range measurement devices is provided with a transceiver capable of outputting a unique code and information that can be used in range measurement, and receiving from other range measurement devices unique codes and information that can be used in range measurement. Range measurements from range measurement devices on the object or located in the environment are used to derive the relative position of the range measurement devices, from which a relative position of the objects, or of the object and an environment can be derived.

19 Claims, 4 Drawing Sheets

*An RMD based stylus whose position and orientation can be determined relative to the display.*

Figure 1: *An RMD based stylus whose position and orientation can be determined relative to the display.*

Figure 2: *A stylus that can use any surface.*

Figure 3: *The geometry of 3D measurement using ranging between the headset and the target.*

Figure 4

HUMAN-COMPUTER INTERACTION APPLICATIONS OF PRECISE RANGING TECHNOLOGY AND GEOMETRIC DILUTION OF PRECISION IN A RANGING POSITIONING SYSTEM FOR VR

This application is a non-provisional of and claims priority to U.S. Provisional Patent Application No. 62/359,518, entitled "Human-Computer Interaction Applications of Precise Ranging Technology and Geometric Dilution of Precision in a Ranging Positioning System for VR" filed on Jul. 7, 2016. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of deploying discrete radio frequency (RF) range measurement systems, and in particular to the use of such measurement systems for writing and VR applications.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

DETAILED DESCRIPTION

Human-Computer Interaction Applications of Precise Ranging Technology

As used herein, the term range measurement device or RMD refers to a device that as part of a system of two or more such devices can measure range between at least two RMDs. RMDs are typically low cost radio frequency (RF) range measurement systems with high accuracy (e.g., 10 millimeters of precision or better) which have the higher signal bandwidths and signal processing capability that modern semiconductor processes provide. It will be apparent to one of skill in the art that methods such as those described in U.S. Pat. No. 7,646,330 and as well as other technologies can be adapted to create low cost, battery-operated range measuring devices with accuracies of 1 millimeter or better, measurement update rates on the order of 1 kilohertz and effective ranges of a few meters or more. Such devices are not presently popular however because of limited application. This application considers a variety of important and novel uses of RMDs having one or more of the following described characteristics.

In an embodiment, an RMD fits in a small volume. In an embodiment, an RMD fits in a volume of a few millimeters on a side. In an embodiment, an RMD fits in a volume having no dimension in excess of 5 millimeters. In an embodiment, an RMD has a volume of less than 20 millimeters, or less than 10 cubic millimeters, or less than 8 millimeters, or less than 5 millimeters.

In an embodiment, RMDs provide peer-to-peer operation. In an embodiment, an RMD can initiate communication with or respond to another RMD.

In an embodiment, two RMDs can accurately measure the distance between them. In an embodiment, two RMDs can be used to accurately measure the distance between them. In an embodiment, an RMD can determine the distance between itself and another RMD to accuracy of less than a couple of millimeters. In an embodiment, an RMD can determine the distance between itself and another RMD to accuracy of 1 millimeter. In an embodiment, an RMD can determine the distance between itself and another RMD to accuracy of less than 1 millimeter.

In an embodiment, multiple RMDs can operate in an effective simultaneous manner. In an embodiment, RMDs operate in an effectively simultaneous manner by employing multiplexing. In an embodiment, RMDs operate in an effectively simultaneous manner by employing time division multiplexing. In an embodiment, multiple RMDs can operate by taking turns with each other. In an embodiment, RMDs operate in an effectively simultaneous manner by employing frequency division multiplexing. In an embodiment, multiple RMDs can operate in an effectively simultaneous manner by using different frequencies. In an embodiment, multiple RMDs can operate in an effectively simultaneous manner by using non-interfering frequencies. In an embodiment, RMDs operate in an effectively simultaneous manner by employing code division multiplexing. In an embodiment, multiple RMDs can operate in an effectively simultaneous manner by using different spreading codes. In an embodiment, multiple RMDs can operate in an effectively simultaneous manner by using non-interfering spreading codes. In an embodiment, RMDs can operate in an effectively simultaneous manner by combining two or more forms of multiplexing, e.g., time division and code division, time division and frequency division, or frequency division and code division.

In an embodiment, RMDs can make successive range measurements. In an embodiment, RMDs can make successive range measurements quickly. In an embodiment, RMDs can make successive range measurements at least every few milliseconds. In an embodiment, RMDs can make successive range measurements every millisecond. In an embodiment, RMDs can make successive range measurements more than every millisecond.

In an embodiment, RMDs can make range measurements of a distance of 20 centimeters or more. In an embodiment, RMDs can make range measurements of a distance of at least 50 centimeters. In an embodiment, RMDs can make range measurements of a distance of at least a meter. In an embodiment, RMDs can make range measurements of a distance of up to several meters. In an embodiment, RMDs can make range measurements of a distance in excess of several meters.

In an embodiment, RMDs can report range measurements across a distance of 20 centimeters or more. In an embodiment, RMDs report range measurements across a distance of at least 50 centimeters. In an embodiment, RMDs report range measurements across a distance of at least a meter. In an embodiment, RMDs report range measurements across a distance of several meters. In an embodiment, RMDs report range measurements across a distance in excess of several meters.

In an embodiment, RMDs are individually addressable. In an embodiment, an RMD can have peer-to-peer communications by addressing another RMD. In an embodiment, an RMD can have ad hoc communications by addressing another RMD. In an embodiment, an RMD can communicate with, or query, another RMD to obtain the distance (i.e., a range measurement) between them.

In an embodiment, an RMDs can transfer data to another RMD. In an embodiment, an RMDs can transfer its own identity (e.g., address) to another RMD. In an embodiment, an RMDs can transfer its own identity along with other information to another RMD. In an embodiment, an RMDs can transfer a measured or calculated distance to another RMD. In an embodiment, an RMDs can transfer a measured or calculated distance along with other information to another RMD.

In an embodiment, an RMD can output a measured distance to an external device, e.g., a non-RMD device. In an embodiment, an RMD can output a measured distance to a non-RMD device such as an RMD controller or a computer. In an embodiment, at least one RMD in a system of RMDs can communicate to an external device.

Other characteristics of an RMD will be apparent to persons of skill in the art in view of the teachings and disclosure herein.

In an embodiment, RMDs are group addressable. In an embodiment, RMDs have broadcast modes. In an embodiment, RMDs can respond to a broadcast from an external device such as a controller, or a computer. In an embodiment, RMDs in a system are of different forms and/or different sizes. In an embodiment, RMDs can be used to measure range rate (e.g., relative velocity). In an embodiment, RMDs are configured for master-slave operation.

The characteristics of an RMD used in a particular system can be selected by making tradeoffs between the above characteristics (e.g., increasing range while decreasing the update rate or measurement accuracy).

Numerous novel applications exist for RMDs. The RMD applications may be considered individually. In an embodiment, one or more of the RMD applications described below (or parts of them) may be combined in a single system, product or other application.

Application 1: A Stylus Used for Input on a Computer Display

In an embodiment, a computer input device used to draw, write, indicate or otherwise interact with a computer display has RMDs located on the computer display and on the stylus. In an embodiment, two RMDs fixed to the display can be used to track the stylus in two dimensions. Using two RMDs fixed to the display provides two-dimensional information if the stylus is touching the display surface. In an embodiment, more RMDs can be fixed to the display. More than two RMDs fixed to the display can be used to detect the device in three dimensions, thus, allowing "hover operation" i.e., hover detection. In an embodiment, a sensor on the stylus may be used to determine if the stylus is in direct contact with the display (e.g., a pressure switch, pressure sensor, etc.). In an embodiment, an RMD near the tip of the stylus may allow accurate tracking of the stylus tip so that a collection of range measurements may be converted to the location and velocity of the tip, relative to the display surface. In an embodiment, data reflecting the tip's coordinates and/or the top's motion relative to the display-mounted RMDs may be transferred to a computer for processing. In an embodiment, data reflecting the tip's coordinates and/or the top's motion relative to the display-mounted RMDs may be used to determine one or more of motion, drawing, writing, selection and other types of interaction with the computer and its user interface.

In an embodiment, a stylus may be equipped with more than one RMD. In an embodiment, data reflecting the coordinates and/or the motion relative to the display-mounted RMDs of multiple stylus mounted RMDs may be used to determine the stylus' orientation or changes in orientation with respect to the display surface. In an embodiment, two RMDs may allow the orientation and changes in orientation of the stylus, but not its rotation. In an embodiment, three or more RMDs on the stylus (that are not all along the same line) may allow its the stylus' orientation, changes in orientation, rotational orientation and rotational motion to be determined.

In an embodiment, data from a system having at least three RMDs on a stylus and multiple RMDs on a display may be used to determine position and tilt relative to the display, as well as the stylus' rotation or any rotational changes. In an embodiment, data from at least three RMDs on a stylus and multiple RMDs on a display may be used to model and/or mimic useful drawing attributes. In an embodiment, a stylus can be used as a calligraphy pen where rotation and tilt will change the width and visual characteristics of the inked line.

In an embodiment, in an effort to mimic the natural gestures performed with a pencil, a system may be designed so that when the stylus is flipped over, the system enters an erase mode. In an embodiment, a system may be designed so that when the stylus is flipped over or a moved about in space in a particular manner, a different type of drawing tool or input, or change in characteristics of the inked line (e.g. weight, color, texture, etc.) In an embodiment, a sensor on the opposite end to the tip (but similar to the one on the tip), may be used to detect contact or proximity between the stylus and the display surface.

In an embodiment, an RMD can determine the position of another RMD by computing geometrical relationships. The distance from an RMD to its target places the target on a sphere centered on the RMD whose radius is the measured distance. If two different RMDs measure the distance to a target, the target will lie somewhere on the locus of points where the spheres intersect. In an embodiment, the intersection of two spheres may be sufficient to determine the location of the target given another constraint, such as a constraint that the stylus is known to be in contact with a display surface. In an embodiment, the intersection of two spheres may be sufficient to determine the location of the target, e.g., on a two-dimensional manifold such as a display screen. The intersection of three spheres is sufficient to determine the location of the target to one or two points. In an embodiment, two-point ambiguity can be resolved by other information, e.g. by knowing that the stylus is in front of the display screen and cannot be behind it. The intersection of four points determines the location of the target without ambiguity, and may provide extra information that can be used to mitigate measurement errors.

In an embodiment, the stylus may have buttons or other user sensors (e.g. a slide control, a touch surface, a fingerprint sensor, touch sensors) to enable even richer user interface applications. Sensors in the stylus can be used along with the RMD range data to improve, enhance or possibly replace or enhance some or all of the range data and its derived information. Sensor fusion such as this could use data from accelerometers, turn rate sensors, magnetometers, etc.

Figure 1:
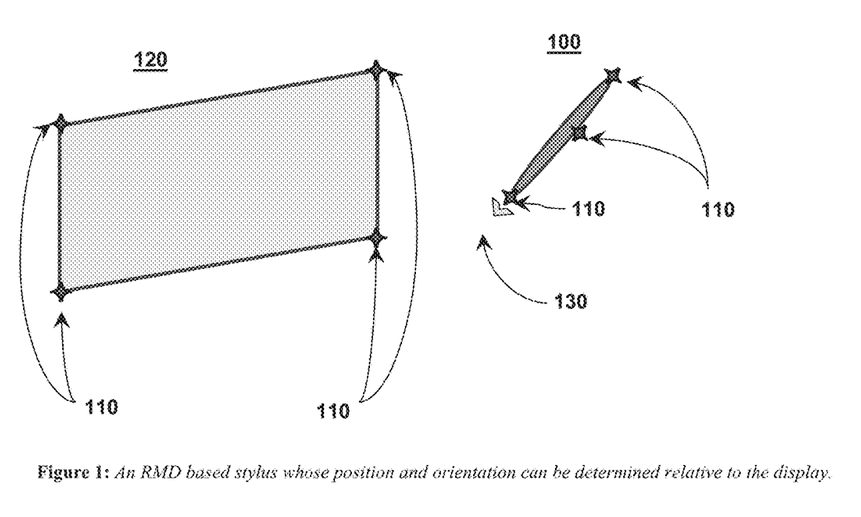
FIG. 1 shows an exemplary embodiment of a stylus and display device.

FIG. 1 shows an exemplary embodiment of the present invention implemented in a stylus 100 and display. In an embodiment RMDs 110 are located at the four corners of a display surface 120, and at multiple locations on the stylus 100. In an embodiment, three or more RMDs 110 are located on the stylus. In an embodiment, to provide resolution for rotation measurements, RMDs 110 on the stylus 100 are not all located on a line. In an embodiment, a tip sensor 130 is provided at one or both ends of the stylus.

Application 2: A Stylus that can be Used on any Surface

In an embodiment, the stylus need to be limited to a particular surface, or to any surface. In an embodiment, RMDs can be used to locate the stylus within an environment. In an embodiment, RMDs are placed within an environment, e.g., on the walls of the room to provide a free-form environment. In an embodiment, environmentally-located RMDs can determine the position and orientation of a stylus with RMDs within their range. In an embodiment, environmentally-located RMDs can determine the position, orientation and rotation of a stylus with three non-colinear RMDs when the stylus is within range of the environmentally-located RMDs. In an embodiment, a surface within the environmental range of at least three of the environmentally-located RMDs could operate as a writing or drawing surface. In an embodiment, a tip sensor may provide indication of contact with a surface. In an embodiment, utilization of the stylus on any planar surface can be detected because of the planar nature of the motion of the tip, which can be distinguished in software from freeform movement in space.

Figure 2:
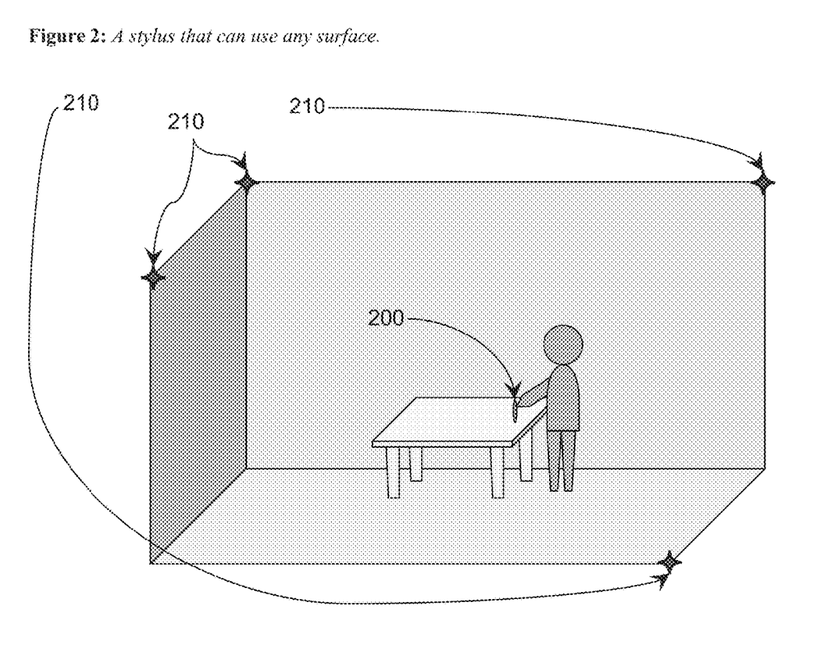
FIG. 2 shows an embodiment of a stylus having an internal range measuring device located within an environment enabling the internal range measuring device.

FIG. 2 shows an embodiment of the present system and method deploying a stylus 200 having one or more RMDs therein (not shown) located within an environment having environmentally-located RMDs 210. In an embodiment, three or more environmentally-located RMDs 210 are placed within the environment. In an embodiment, three or more environmentally-located RMDs 210 are placed in or near the corners of a room environment. In an embodiment, four or more environmentally-located RMDs 210 are placed within a room-type environment, but the four or more environmentally-located RMDs 210 not all being on a common plane.

In an embodiment, a calibration step may be performed so that relative positions of the environmentally-located RMDs 210 may be determined. In an embodiment, the environmentally-located RMDs 210 may perform some or all of the calibration step. In an embodiment, each environmentally-located RMD 210 can determine its distance to each other of the environmentally-located RMDs 210, thereby determining their relative positions. In an embodiment, the environmentally-located RMDs 210 provide data to a control system perform some or all of the calibration step. In an embodiment, other sensors (not shown) may be employed to determine angles, gravity vectors, the local magnetic field, etc., to provide information about the environment, or about the relative or absolute positions of the environmentally-located RMDs 210.

In an embodiment, a user could move about the environment, carrying e.g., the stylus and a convenient writing/drawing surface. In an embodiment, a user could employ any surface that is handy as a drawing surface: a desk, a wall, a pad of paper, a hand, a window, etc. Range data can be transmitted from the RMDs into a computing device where it can be used in calculations to determine the position and orientation of the stylus. In an embodiment, the environmental RMDs can transmit their own position data to the RMD(s) in the stylus, allowing the stylus to use that data, along with the ranges that it can measure, to determine its own location and orientation. In an embodiment, a stylus with RMDs is configured to receive range information from environmentally-located RMDs, and using this information, can determine its own position. In an embodiment, the stylus can determine its own position with no information other than the signals it receives from the environmentally-located RMDs.

In an embodiment, a stylus comprises at least two RMDs, and at least one of the stylus RMDs knows the relative positions of the others, and, at least one of the stylus RMDs is configured to receive range information from environmentally-located RMDs; in this way, the system of RMDs in the stylus can determine the stylus position and orientation. In an embodiment, the stylus can determine its own position and orientation with no information other than the signals it receives from the environmentally-located RMDs. In an embodiment, a stylus comprises at least three RMDs that are not on a line, and at least one of the stylus RMDs knows the relative positions of the others, and, at least one of the stylus RMDs is configured to receive range information from environmentally-located RMDs; in this way, the system of RMDs in the stylus can determine the stylus position, orientation and rotation. In an embodiment, the stylus can determine its own position, orientation and rotation with no information other than the signals it receives from the environmentally-located RMDs.

In an embodiment, multiple styluses may be used at the same time in an environment. In an embodiment, one stylus can determine another stylus' relative position based on the other stylus' RMD data. In an embodiment, one stylus can determine another stylus' relative position and orientation based on the other stylus' RMD data. In an embodiment, one stylus can determine another stylus' relative position, orientation and rotation based on the other stylus' RMD data. In an embodiment, stylus RMD data may be provided directly from one stylus to another. In an embodiment, stylus RMD data may be provided by an intermediary such as a controller or computer, or environmentally-located RMDs.

In an embodiment, a stylus may be provided with absolute position information relating to one of its RMDs, one or more environmentally-located RMDs, or an RMD in another stylus or other object. In an embodiment, once provided with absolute position information the stylus may thereafter deduce absolute position information for itself, and/or for another stylus.

In an embodiment, styluses determine each others' relative positions and/or orientations and/or rotation, to enhance the ability to determine stylus positions and orientations relative to the environmental RMDs or to allow the styluses to operate with environmental RMDs in some applications.

Application 3: A Game Controller or Other Handheld or Worn User-Interface Device In an embodiment, a device other than a stylus may include RMDs. Thus, instead of just a stylus or writing instrument, the RMD-enabled device can be another kind of user interface device, such as a game controller, a wearable, a telephone, clothing, jewelry or some other object carried or worn by the user.

In an embodiment, a game controller comprises one or more RMDs. In an embodiment, a game controller that may be used as an input device for a game console, computer, tablet, telephone, etc. is fitted with three or more RMDs. In an embodiment, as with a stylus, a game controller's position, orientation and/or rotation may be determined by reference to information from environmentally located RMDs and RMDs located in the controller. In an embodiment, as with the stylus, the range information between and among RMDs can be used to determine relative position, orientation and/or rotation, which can be done by RMDs in the game controller, by RMDs external to the game controller, or by a controller or other device or system (e.g., a game console, computer or environmental system) external to the RMDs.

In an embodiment, an RMD system including environmentally-located RMDs and game-controller located RMDs may allow game play (or other input tasks) while moving about the RMD-covered environment, e.g., the room. In an embodiment, environmentally-located RMDs are mounted on the game console or another host device. In an embodiment, environmentally-located RMDs are positioned in a room, e.g., on walls, ceiling, floor, bookshelves, etc. In an embodiment, environmentally-located RMDs are positioned in a room such that they are not all in the same plane. In an embodiment, the environmentally-located RMDs are located on a combination of the wall, the ceiling, the floor. In an embodiment, the location, orientation and/or rotation information determined for the game controller can be used as input to the game, which may directly control game play or which may alter the game's environmental parameters, such as the player's position, orientation, viewpoint, etc.

In an embodiment, the RMDs can be deployed on a wearable device or item of clothing, or an object that can be worn by the user. In an embodiment, the wearable deployment of RMDs may allow the user to interact with a game or other computer application by moving around, changing their pose or orientation, gesturing, etc. In an embodiment, RMDs deployed on wearables can determine range from each other, and thus determine relative position. In an embodiment, RMDs on multiple users can be used to determine relative position between and among the users in addition to providing information that can be used to infer or determine pose, orientation and other biometric data.

Application 4: Tracking a VR/AR Display

In an embodiment, the RMDs can be deployed on a virtual reality (VR)/augmented reality (AR) display, such as a headset. In an embodiment, the position and orientation (and rotation) of the display can be tracked, with low latency, so that as its user moves around, information about that movement can be reflected in the way data is displayed to the user, or to other users who are interacting with him/her.

In an embodiment, the VR/AR display is tracked from environmentally located RMDs around the room or space. In an embodiment, the VR/AR display is tracked from environmentally located RMDs located on the console, computer, or other device that has a data, computation or other relationship with the display. In an embodiment, the VR/AR display may track the location and orientation of a handheld controller, wearable other device being used by the display's wearer or by another user who is interacting in some way with the display user. In an embodiment, RMDs are deployed both on a headset or head-mounted display and on wearables, which may be providing information concerning pose and gestures or from which gesture and pose can be inferred. In an embodiment, additional environmental RMDs (e.g., on a game console, or elsewhere in the environment) can be utilized to measure or infer position of the game player within an environment, as well as to supplement information concerning pose and gestures or from which gesture and pose can be inferred.

Application 5: Combining Range Measurement Devices for Roaming

In an embodiment, environmentally located RMDs need not be confined to one room or space. In an embodiment, RMDs may be distributed throughout a house or building. In an embodiment, RMDs may be distributed throughout multiple buildings to an entire complex, campus or neighborhood. In an embodiment, RMDs may be distributed throughout a geographic or political region such as a city or country. In an embodiment, RMDs may be distributed throughout the world. In an embodiment, RMDs may be distributed such that users can roam among spaces and use (e.g., query or respond to) whatever environmentally located RMDs are in range at the time. In an embodiment, environmentally located RMDs are aware of and can report position information (i.e., they know and can report their own location) and can provide that information to other RMDs separately, or along with range measurements. In an embodiment, position information known to an RMD is relative to one or more other RMDs. In an embodiment, position information known to an RMD is relative to geographic coordinates on the earth. In an embodiment, position information known to an RMD is relative to coordinates within its environment.

In an embodiment, an RMD may have information concerning its coordinates within its environment, and may query one or more other RMDs to obtain coordinates of the environment with respect to another environment or with respect to geographic coordinates. As an illustrative example, a grouping of environmentally located RMDs may be located in hold or other space on a cargo ship, and another grouping of environmentally located RMDs may be located on a vehicle (e.g., forklift or crane) that resides on the ship. Yet further RMDs may exist throughout the ship. In an embodiment, each of these groups of RMDs may be provided or be able to determine its position within the ship, but e.g., some RMDs on the ship may be provided or be able to identify their own geographic coordinates. Thus, despite its movement about the ship, a forklift on the ship could know the position of its fork, its position on the ship, its geographic location on the planet, as well as the position and orientation of a user that is wearing wearable RMDs.

In an embodiment, a system comprising the RMDs can perform a handoff operation for tracking between different environmentally located RMDs. In an embodiment, a system comprising the RMDs can perform a handoff operation for minimally uninterrupted tracking between different environmentally located RMDs. In an embodiment, where uninterrupted tracking is desirable, a system comprising the RMDs can perform a handoff operation such that tracking appears seamless between different environmentally located RMDs. In an embodiment, interruptions between areas served by environmental RMDs may be bridged using another positioning technique, such as GPS, dead reckoning, inertial navigation, etc.

Application 6: Optimizing Sound Input or Output to or from Specific Listeners

In an embodiment, positions and orientations (including, e.g., rotational orientation) of people are tracked with sufficient spatial and temporal resolution, and tracking information is used to tailor local sound emissions for a one or more of the people. A plurality of speakers can emit different sounds and, using the position of a person's ears and knowledge of the acoustical environment and the sounds intended to be heard, the sounds can be modified so the target person hears enhanced sounds, such as stereo, binaural stereo or "environmentally immersive (3-D)" sound, without having to wear headphones. In an embodiment, the sound transmission can be done in a manner similar to the way a MIMO radio system transmits, by tailoring the sounds emitted from each of the speakers so that the desired sound goes into each of the target's ears, and in an embodiment, unintended sounds either do not go in, or are attenuated or cancelled at the ear location.

In an embodiment, multiple people are tracked and provided with enhanced sound.

In an embodiment, the enhanced sound may provide a quieter environment than would exist absent the sounds emitted from the speakers. In an embodiment, the enhanced sound is quieter than the ambient sound, e.g., silence.

In an embodiment, the emitted sounds are tailored so that some users can hear a sound while others either cannot hear that sound, or can hear only an attenuated version of the sound.

In an embodiment, the enhanced sound system may be deployed where privacy is desired by a person listening or speaking. In an embodiment, an enhanced sound system may be deployed for use when one person is directly speaking to another person. In an embodiment, an enhanced sound system may be deployed for use when one person is directly speaking into a telephone or other communication device. In an embodiment, emitted sounds are tailored so that interfering sounds are heard throughout a space (e.g., a room or other listening area), and the interfering sounds make it difficult to understand what the speaker is saying except where desired. In an embodiment, sounds are attenuated or cancelled (i.e., absent) at the speaker's ears and possibly communication device (which may be tracked by RMDs as well). In an embodiment, the interfering sounds emitted are targeted to the ears of one or more specific persons, and can only be heard by that subset of persons, but not others. In an embodiment, noise is generally broadcast into the environment, but targeted sounds tailored to cancel the noise are provided to the ears of one or more specific persons, and thus, the noise is only cancelled or attenuated for that subset of persons, but not others, thereby allowing only the subset of persons to hear the originally spoken information.

Application 7: Targeting Information from a Visual Display to Specific Viewers and Viewpoints In an embodiment, positions and orientations of people are tracked with sufficient spatial and temporal resolution, and visual displays send different display information to specifically tagged individuals, devices or object. There are various such types of multi-view displays, including, without limitation lenticular displays, projector-based displays, etc. In an embodiment, multi-view displays combined with an RMD tracking system as described above that can track the position of a person's eyes (e.g., using position of head-mounted RMDs) can allow different people to see different displayed material based on their location (e.g., identity as designated or provided by a tracking system). In an embodiment, different information can be provided for each eye of a user, which could provide stereo a display without the need to wear special glasses or headsets. In an embodiment, a view as seen by a user (stereo or otherwise) can be changed as the user moves around the display. In an embodiment, as the user moves with respect to a display, the view as seen by a user is updated to reflect the user's point of view into the scene displayed.

In an embodiment, the display shows the same information everywhere in its viewing area, but the information displayed changes according to the position and orientation of a viewer or viewers. In an embodiment, a 3-D like experience is provided for a viewer or viewers, by using only standard displays and with no need for special glasses or headsets. In an embodiment, as a user moves in a viewing area, the point of view into a displayed scene is altered. In an embodiment, a virtual world is viewed through a two-dimensional screen, RMDs are used to track the movement of the viewer in the viewing area, and the point of view in the virtual world is changed in response to the movement of the viewer in the viewing area.

Application 8: Security Via Proximity

In an embodiment, position and orientation tracking with RMDs can be used to enhance security of, e.g., computer systems, internet of things devices, consumer devices, vehicles, valuable or dangerous devices and equipment. In an embodiment, a system can require a user wearing a specified RMD to be within a certain proximity of the device before it can be used, or before it can be used in a secure mode. For example, in an embodiment, a user (or the RMD device that they bear) must be within a geofenced area to access the device, or use it in a secure mode. Alternately, the system can be used as a lock out for dangerous devices. For example, in an embodiment, a device will not to operate if an RMD is within a specific area. Thus, for example, if an object containing an RMD must stay within a confined area, a door to the area may lock or remain locked if the object is brought within a geofenced area of the door.

In an embodiment, RMDs can be used to track gestures, and thus, gestures can be used as part of an enhanced security system. In an embodiment, a device (such as a phone) will unlock if the user wears a ring with a specific RMD and performs a "reaching" motion toward the phone, which may be detected by measuring the position and velocity of the RMD moving toward the phone, or e.g., the distance between the two decreasing at some rate. A device (e.g., a phone) can similarly be put in a locked stated by a move-away gesture, i.e., the user moving their hand away from the device. A security systems may use very fine granularity of a gesture to grant and deny access. Thus, for example, RMDs can be used to learn by repetition the variation within a repeatable secure gesture of an authorized user; another user, who may observe the gesture, may not be able to repeat it within the variations from the original user. As an illustrative example, consider a stylus with just two RMDs to be used for a signature: while an imposter may be trained to replicate the finished signature of the authentic user (i.e., to make it look like the same signature) by studying the signature, and even by watching the authentic user perform the signature, the very fine granularity of motion of the two RMDs that result from making the signature may not be easily understood or replicated by the imposter.

In an embodiment, access can be granted in such a small space that there is no chance that an unauthorized user could use that space along with the authorized user, and authorization can be revoked immediately (i.e., within milliseconds) after an authorizing RMD leaves the geofenced space.

In an embodiment, a user interface device, such as a keyboard, is locked until a hand bearing an appropriate RMD is extremely close to the device. In an embodiment, a display is in a "locked" state (e.g., blank) unless a user wearing the appropriate RMD is in the right position to view the display.

Cryptographically secure signing and encryption methods can be used to ensure that only authorized RMDs are recognized, or will even communicate with each other. In an embodiment, public key cryptographic methods are used to verify ranging and data transactions between RMDs. In an embodiment, these transactions can be recorded and compared to provide evidence that a particular device was in proximity (for example, a certain relative location and orientation) of other devices at a particular time.

In an embodiment, a ring bearing one or more RMDs can be used as a digital "signet" ring for authorization and evidentiary purposes can be worn by a user. In an embodiment, a device bearing one or more RMDs is worn by, attached to or implanted in the user and can be used for authorization or evidentiary purposes. In an embodiment, the device bearing an RMD measures biometric data from the user so that the device will only function when born by that user. In an embodiment, a plurality of such devices are born by the user and will only function for authorization and evidentiary purposes when a subset of them are in a designated position and orientation relative to each other and to the device or devices requesting authorization or providing or requiring evidence.

Application 9: Signing Stylus

A stylus as described above can have security, authentication and evidentiary features added to enable it to be used to provide proof of identity, digital signatures, biometrics, etc. in a highly secure and difficult-to-spoof matter.

In an embodiment, the RMD-equipped stylus communicates securely with other RMDs, as described above, allowing its position and orientation to be used for authorization and evidentiary purposes.

In an embodiment, the stylus stores or communicates the RMD transactions and other sensor data so that the trajectory and motion of the user's signature can be combined with the secure RMD transactions to prove that the signature is valid and was performed in a particular location at a particular time and in proximity to particular devices.

In an embodiment, the above information can be packaged in a cryptographically secure manner so that the information cannot be altered and can be used for legal and financial purposes to prove that a signature was made by a particular person at a particular place and time, in the presence of particular devices.

In an embodiment, biometric devices such as fingerprint sensors, palm vein sensors, iris scanners, retinal scanners, DNA sensors, etc. can be included in the stylus so that the information provided by them can be used to further prove the identity of the user.

In an embodiment, a network of location systems (such as distributed RMDs) can be used to find a signing stylus if it is ever stolen or misplaced. In an embodiment, communication along a network can be used to disable the device if it has been declared lost or it is otherwise necessary to render it unusable.

Application 10: Purchasing Device

An RMD enabled device with security and authorization features, such as those described above can be used as a payment device. It can be used to authorize payment or verify the identity or other characteristics of the bearer.

In an embodiment, the purchasing device is in the form factor of a credit card. In an embodiment, the purchasing device is in the form of a key fob. In an embodiment, the purchasing device is in the form of a key. In an embodiment, an RMD can be implanted subcutaneously, and in this discrete location can act as both an identification and purchasing device, as well as providing other functionality as described here, such as being used in gestures and/or for proximity.

In an embodiment, the purchasing device must be within a specified relative position and orientation relative to other devices born by the user. In an embodiment, the purchasing device must be within a specified relative position and orientation relative to other devices that are part of the point-of-sale or transaction system.

In an embodiment, the purchasing device has a biometric sensor that is required to sense the appropriate biometrics of the user before authorization is granted.

Application 11: Control Nearby Object by Changing Proximity and Velocity of Ring, Phone or Other Device with Respect to the Object Any worn, carried, attached, implanted or otherwise born RMD device can be used to control other devices that have RMD capability.

In an embodiment, a media player controller includes an RMD and other RMDs (e.g., environmental RMDs) provide an environment that permits the media player control system to determine its relative location and movements: the volume of a media player device can be changed by making a prespecified gesture with the media player controller. In an embodiment, media play is paused when the media player controller (which may be affixed to the media player) is in a location or in a location at a time where media cannot be consumed, e.g., in a classroom, on an airplane before takeoff.

In an embodiment, a mobile device comprises an RMD, and other RMDs (e.g., environmental RMDs) provide information concerning where and when certain operations should be performed. In an embodiment, for example, because of proximity a mobile phone may be programmed not to provide notices (e.g., make sounds, including ringing), or to attenuate the sound of notices, in certain locations, e.g., in a hospital, in a theater, or in a classroom. In an embodiment, for example, because of proximity and another parameter, a mobile phone may be programmed not to provide notices (e.g., make sounds, including ringing), or to attenuate the sound of notices, in certain locations at certain times, e.g., in a theater when a performance is ongoing, or in a classroom when a lecture is ongoing. In an embodiment, environmental RMDs provide parameters for permitted actions along with the range measurements. In an embodiment, environmental RMDs provide schedules of permitted actions along with range measurements. In an embodiment, environmental RMDs provide classifications of the environment (e.g., theater, classroom, airplane) along with range measurements, and permit the mobile device to determine how to react in view of the classifications. In an embodiment, environmental RMDs provide classifications of the permissible actions in the environment (e.g., sound, light, volume) along with range measurements, and the mobile device to determines how to react in view of the classifications.

In an embodiment, a media player control system includes an RMD and another RMD is included in a device is worn or handled by a user: the volume of a media player device can be changed by making a prespecified gesture with the worn or handled RMD device. In an embodiment, media play can be paused when the worn or handled RMD goes beyond a certain distance (or geofenced area) from the playback device. In an embodiment, media play can be paused when the worn or handled RMD is in a location where media cannot be consumed due to distance, obstruction or design.

In an embodiment having a media player controller provided with an RMD, media play resumes when e.g., an RMD worn or handled by a user returns to within a distance of or area about the media player, or the media player or an RMD worn or handled by a user leaves the area where media cannot be consumed or otherwise enters an area designed for resumption of media play.

A system of RMDs can be deployed to determine head position relative to a display. In an embodiment, RMDs are deployed on the display and a head-worn device (e.g., glasses, earphones, a hat or other headset). In an embodiment, these deployed RMDs can be used to determine the head position with respect to the display. In an embodiment, environmental RMDs may also be used as part of a system that can determine head position with respect to a display. In an embodiment, a system comprising RMDs that can determine head position with respect to a display can be used to pause video when the user is detected as being turned away from the display so that they are incapable of viewing it. In an embodiment, the video starts or resumes when the user is detected as being turned toward the display.

In an embodiment, a remote control or other control device uses an RMD system so that it communicates to the controllable device (such as a television) within a certain range or geofenced area, or e.g., nearest it if there is more than one controllable device. In an embodiment, a remote control or other control device has at least two RMDs so that its direction with respect to one or more controllable devices can be determined, and in this way a device having its own RMD can determine whether the controller's signal is meant for the device based on the direction the device is pointing. In an embodiment, a universal remote control can be used to control a wide variety of colocated devices by choosing which device to control given the location and orientation of the remote control.

Application 12: Aircraft Hijacking Mitigation System

An aircraft hijacking can be very dangerous to the crew, passengers and those on the ground. While military aircraft can intercept the hijacked aircraft, they can do little to mitigate the situation beyond following it, other than the extreme tactic of shooting it down. Modern large aircraft are equipped with fly-by-wire and advanced autopilot systems and, under normal conditions, most of the flying can be performed by the automated systems. However, it is possible that the hijackers can currently turn these systems off from the cockpit. Proposals have been made to be able to take control of an aircraft's autopilot system by radio so that the cockpit can be locked out and the plane can be flown to a safe location and landed automatically. However, a system that would allow radio signals received from the ground to control the aircraft is inadvisable because flaws in the included encryption and security systems might allow an unauthorized individual to take control of the aircraft and cause it harm.

Instead of having the intercepting aircraft shoot down the hijacked aircraft, RMDs can be used in a system to allow the interceptor to take control of the aircraft, guide it to a safe place and have it land. Where the signal from the interceptor could be proven to be emanating from a nearby aircraft at altitude and not from a ground-based transmitter, the probability of unauthorized access is greatly diminished. Cryptographic methods can be used to further ensure that the interceptor is authorized to take control of the hijacked aircraft.

In an embodiment, the authorization communication between the interceptor and the to-be-controlled aircraft must be performed in a near-field-matter, such that a transmitter greater than a specified distance from the to-be-controlled aircraft cannot be used to send the required authorization communications to take over control.

In an embodiment, an RMD with cryptographic verification is used to prove to the to-be-controlled aircraft that the signal is coming from specified distance from the aircraft or a specified location near the aircraft, and so cannot be coming from a ground based transmitter.

In an embodiment, other sensors (such as barometers, GPS, other navigation systems) are used to prove to the to-be-controlled aircraft that it is at an altitude such that the proven distance of the intercepting aircraft cannot be on the ground.

In an embodiment, the mitigation system can be used to take control of a to-be-controlled aircraft that has otherwise not been hijacked. For example, an aircraft that has lost pressurization, causing the crew to become unconscious or otherwise unable to control the aircraft.

Geometric Dilution of Precision in a Ranging Positioning System for VR

Figure 3:
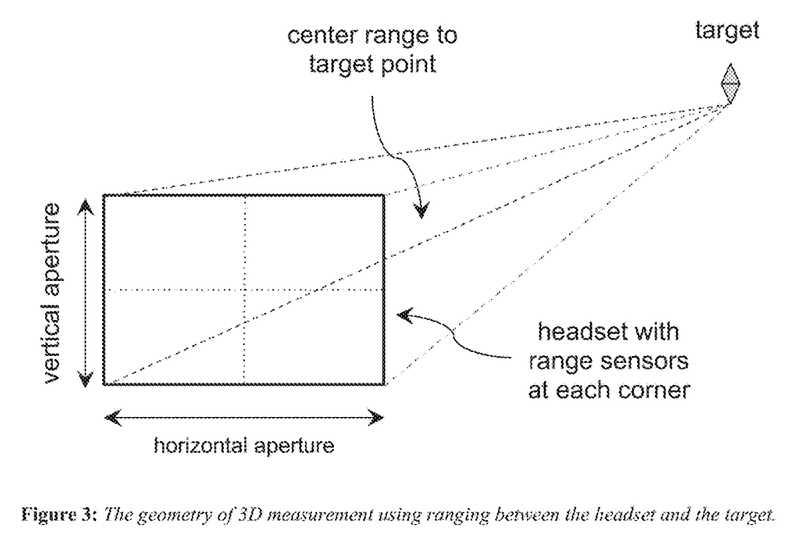
FIG. 3 shows an illustration of geometry of 3D measurement using ranging between a headset and a target in accordance with an embodiment of the present invention.

The following discussion concerns geometric dilution of precision in a ranging position system for virtual reality. Turning to FIG. 3 a diagram of a display having a vertical and horizontal aperture is shown, along with lines showing the direct path to a target point RMD. For illustrative purposes, consider FIG. 3 to represent a VR headset and controller as follows: a VR headset has a 20 cm horizontal extent, 5 cm vertical extent, having RMDs at each of its corners; a handheld controller is located 50 cm away; and the RMDs have 1 mm accuracy. A naive algorithm can determine the position of the controller within 1 mm front-to-back, 5 mm side-to-side and 20 mm up-and-down. Assuming the same, but with the controller 100 cm away, a naive algorithm can determine the position of the controller within 1 mm front-to-back, 10 mm side-to-side and 40 mm up-and-down. In an embodiment, a more sophisticated algorithm, based on covariance matrices, sensor fusion and Kalman filtering over time, can provide substantially better accuracy.

A system using RMDs can determine the relative locations and orientations of the VR headset and handheld controller (e.g., having one or more RMDs, and thus one or more target points). Such a system would use several RMDs that can measure the distance between each other, along with the known positions of these devices on the VR headset and the handheld device. In an embodiment, trilateration is used to solve for the relative 3D positions, given the former information.

The RMDs will have a certain accuracy, yielding a random range error of scale $\sigma$ for each measurement. Due to geometric dilution of precision, the error in calculating a 3D relative position will be larger than $\sigma$, and will depend on the location of the target relative to the headset and the vertical and horizontal apertures of the headset. In an embodiment, geometric errors of this type can be largely eliminated by surrounding the target with range sensors, but that may not be practical in some applications. GPS positioning is one example of this: due to the radio-opaque nature of the Earth, a receiver can only see satellite signals from, at most, a single half-sphere around it.

The range measurements describe spheres around the range sensors and the target will be located at the point where three spheres intersect. At the point of intersection, the spheres can be approximated by planes, each of which has a range uncertainty of $\sigma$.

Note that the sensor geometry shown above is not optimal, and is provided for example purposes only. The sensor geometry shown in FIG. 3 has is a front/back ambiguity, which may be resolved by offsetting one of the range sensors in the front/back direction.

Figure 4:
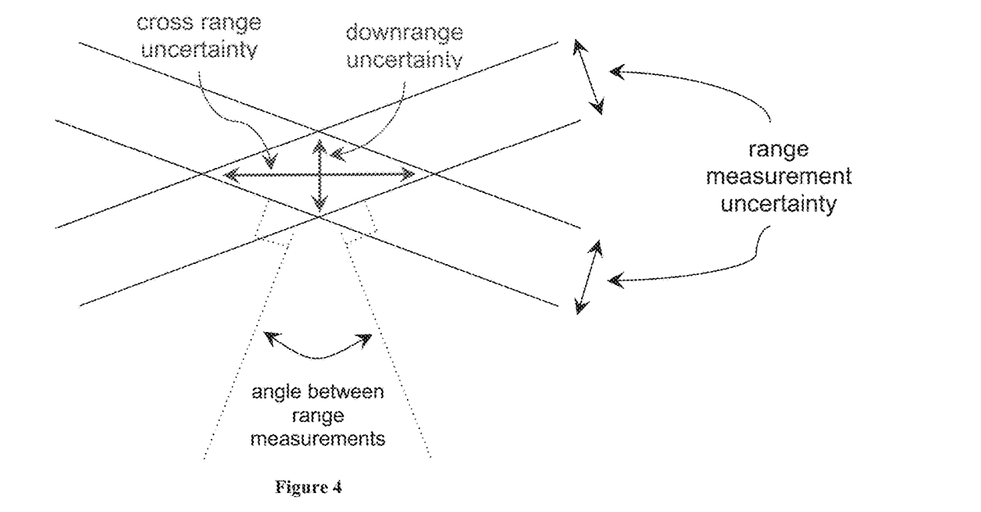
FIG. 4 shows an illustration of a rhombus solvable for downrange and cross range errors in accordance with an embodiment of the present invention.

Because of the angle between two range measurements, the uncertainty in the measured position of the target is larger than the inherent range errors. We can separate the position error into the "downrange" error, in the direction perpendicular to the headset range sensors and the "cross range" error, in the direction parallel to the headset range sensors. FIG. 4 illustrates downrange and cross range uncertainty. In an embodiment, the downrange and cross range errors for a two-dimensional case can be determined by solving the rhombus in FIG. 4. Thus, the downrange and cross range errors can be given by:

$$e_d = \sigma \frac{\sqrt{2(1-\cos\phi)}}{\sin\phi} \text{ and } e_c = \sigma \frac{\sqrt{2(1-\cos\phi)}}{\sin\phi}$$

Where $\phi$ is the angle between the range measurements. When $\phi$ is small, the downrange error approaches $\sigma$ while the cross range error becomes very large. When $\phi$ is near 180 degrees, the downrange error becomes very large and the cross range error approaches $\sigma$. When $\phi$ equals 90 degrees, both the downrange and cross range errors are $\sqrt{2}\sigma$.

In an embodiment where $\phi$ is relatively small (e.g., less than 20 degrees, or less than 30 degrees, or less than about 30 degrees), the above can be approximated to within a few percent as $$e_d \approx \sigma \text{ and } e_c \approx \frac{2}{\phi}\sigma$$

The table below shows some numbers for a representative headset size and several distances to the handheld target.

In an embodiment, to calculate the target's position the errors are treated as Gaussian probability density functions (PDFs). A well-designed ranging system will have measurement errors that are independent (both between sensors and over time) and Gaussian. Thus, in an embodiment, each measurement is turned into a three-dimensional covariance matrix with variance $\sigma^2$ in the direction of the range measurement, and with "large" variances in the other two orthogonal dimensions. Because each range measurement is independent of the others, the PDF of a combination of them will be the normalized product of their PDFs. In an embodiment, the following calculation can be used:

$$\Lambda_{prod}^{-1} = \Sigma_{i=1}^{n}\Lambda_i^{-1} \text{ and } \Lambda_{prod}^{-1}\underline{\mu}_{prod} = \Sigma_{i=1}^{n}\Lambda_i^{-1}\underline{\mu}_i$$

Where $\Lambda_{prod}$ and $\Lambda_i$ are the covariance matrix of the product and the individual covariance matrices, respectively, and $\underline{\mu}_{prod}$ and $\underline{\mu}_i$ are the mean vector of the product and the individual mean vectors, respectively.

In an embodiment, an iterative technique is used. In an embodiment, an iterative technique is used thus providing a rough solution for the location of the target in order to get the range directions necessary to create covariance matrices. In an embodiment, a rough solution is computed using geometric methods, without proper error estimates. In an embodiment, a rough solution is computed using a delta from a prior solution, without proper error estimates. In some embodiments, the rough estimate is used to compute a better PDF. In an embodiment, only one iteration is required. In an embodiment, for additional accuracy, additional iterations are required.

In an embodiment, this novel use of PDFs provides a reliable means to combine measurements from more than one sensor or from the same sensors over time. Combining measurements in this way leads to a sensor-fusion solution where range measurements can be combined with other sensor measurements, the physical dynamics of the system and the use of Kalman filtering, to yield an optimal estimate

TABLE 1

Errors for representative headset sizes and handheld target ranges.

| Headset Horiz Aperture | Headset Vert Aperture | Target Range | Angle Between Horiz Ranges | Angle Between Vert Ranges | Horiz Down Range Error | Horiz Cross Range Error | Vert Down Range Error | Vert Cross Range Error |
|---|---|---|---|---|---|---|---|---|
| 20 cm | 5 cm | 50 cm | 23.1 deg | 5.7 deg | 1.02 σ | 4.99 σ | 1.00 σ | 20.1 σ |
| 20 cm | 5 cm | 100 cm | 11.5 deg | 2.9 deg | 1.01 σ | 9.98 σ | 1.00 σ | 39.5 σ |
| 20 cm | 10 cm | 50 cm | 23.1 deg | 11.5 deg | 1.02 σ | 4.99 σ | 1.01 σ | 9.98 σ |
| 20 cm | 10 cm | 100 cm | 11.5 deg | 5.7 deg | 1.01 σ | 9.98 σ | 1.00 σ | 20.1 σ |

In an embodiment, a headset with a 20 cm horizontal baseline (nee aperture) between range sensors and a 5 cm vertical baseline between range sensors is provided, the downrange error is σ, horizontal and vertical cross range errors are 5σ and 20σ at 50 cm in front of the headset and horizontal and vertical cross range errors are 10σ and 40σ at 100 cm in front of the headset.

If σ is 1 millimeter and the target is a meter from the headset, the distance from headset to target can be measured down to a millimeter. The target's right-left distance can be measured to 1 centimeter and it's up-down distance to 4 centimeters.

The above-noted figures are actually worst-case because the errors are calculated from two separate two-dimensional measurements. In an embodiment, better results are achieved by combining all of the measurements, which would reduce the total error.

of the relative locations, orientations and velocities in the system. Such an estimate will be much more accurate than one computed from a set of range measurements alone.

In an embodiment, determining the orientation of the target using range measurements will require more than one range sensor in the target. In an embodiment, two range sensors are employed to allow the target's orientation to be determined, except for an unknown rotation around the axis between the two sensors. In an embodiment, three range sensors are employed (not in a line) to allow the target's orientation to be determined completely.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic.

It should be recognized that the drawings provided with this application are provided to illustrate a very basic embodiment of this much broader and more detailed disclosure and the many inventions disclosed herein. The scope of this invention disclosure is not intended to be limited by the illustrated embodiment, but rather, by the claims as read and understood by a person of skill in the art, in view of this written and illustrated disclosure. While the invention has been particularly shown and described with reference to a numerous embodiment thereof, it will be understood by those skilled in the art that various changes in form and details may be made therein without departing from the spirit and scope of the invention.

What is claimed is:

1. A stylus comprising:
elongated stylus body having a tip end and an opposite end;
first range measuring device fixedly positioned on the tip end of the stylus body and a second range measuring device fixedly positioned on the opposite end of the stylus body;
each of the first and second range measuring devices each being associated with a unique identification code, and each of the first and second range measuring devices comprising:
a radio frequency transceiver adapted
to transmit the unique identification code associated with that range measuring device and other information that can be used for range measuring, and
to receive from at least one other range measuring device a unique identification code associated therewith, and to receive other information that can be used measure the range between that range measuring device and the at least one other range measuring device associated with a received unique identification code.

2. The stylus of claim 1, further comprising:
a tip on the tip end of the stylus; and
a tip sensor operatively connected to the tip, the tip sensor being configured to sense contact between the tip and a solid object.

3. The stylus of claim 1, further comprising:
third range measuring device fixedly positioned away from the first and second range measuring devices, the third range measuring device being located in a position away from a line formed between the first and second range measuring devices.
the third range measuring devices being associated with an identification code unique to that third range measuring device, the third second range measuring device comprising:
a radio frequency transceiver adapted
to transmit the unique identification code associated with that range measuring device and other information that can be used for range measuring, and
to receive from at least one other range measuring device a unique identification code associated therewith, and to receive other information that can be used measure the range between that range measuring device and the at least one range measuring device associated with a received unique identification code.

4. The stylus of claim 3, further comprising:
writing surface having a first, second and third surface-based range measuring device each being fixedly positioned proximate to a each of a first, second and third corner of the writing surface, the first, second and third surface-based range measuring devices each being associated with an identification code unique to that range measuring device, the first, second and third range measuring devices each comprising:
a radio frequency transceiver adapted
to transmit the unique identification code associated with that range measuring device and other information that can be used for range measuring, and
to receive from at least one other range measuring device a unique identification code associated therewith, and to receive other information that can be used measure the range between that range measuring device and the at least one range measuring device associated with a received unique identification code.

5. The stylus and writing surface of claim 4, wherein the writing surface is a display.

6. The stylus and display surface of claim 5, further comprising:
processor adapted to receive a plurality of temporally spaced range measurements from each of the first, second and third range measuring devices, and to use those range measurements to determine a set of changes in position, orientation and rotation of the stylus with respect to the display surface.

7. The stylus and display surface of claim 5, further comprising:
processor adapted to receive a plurality of temporally spaced range measurements from each of the first, second and third surface-based range measuring devices, and to use those range measurements to determine a set of changes in position, orientation and rotation of the stylus with respect to the display surface.

8. The stylus of claim 1, further comprising:
communications processor to facilitate secure peer-to-peer communications between the first range measuring device and at least one off-stylus range measuring device.

9. The stylus of claim 1, further comprising:
memory operatively connected to the first and second range measuring device and configured to store position and orientation information determined by the first and second range measuring device, which position and orientation information are associated with a period during which the stylus was used to create a signature.

10. The stylus of claim 9, further comprising:
second memory configured to store position and orientation information associated with an individual's signature; and
processor operatively connected to the memory and the second memory, and configured to compare position and orientation information associated with an individual's signature to the position and orientation information associated with a period during which the stylus was used to create a signature, and to communicate to a system outside the stylus the result of that comparison.

11. The stylus of claim 9, further comprising:
GPS device for determining and recording the GPS position information associated with the period during which the stylus was used to create a signature.

12. The stylus of claim 11, further comprising:
communications processor to facilitate secure communications between the stylus and an off-stylus system, the communications processor configured to transmit the position and orientation information associated with a period during which the stylus was used to create a signature and the GPS position information to the off-stylus system.

13. The stylus of claim 9, further comprising:
communications processor to facilitate secure communications between the stylus and an off-stylus system, the communications processor configured to transmit the position and orientation information associated with a period during which the stylus was used to create a signature to the off-stylus system.

14. The stylus of claim 9, further comprising:
position locating device for determining and recording the spatial coordinate information associated with the period during which the stylus was used to create a signature.

15. A system comprising:
elongated stylus body having a tip end and an opposite end;
first data transmitter fixedly positioned on the tip end of the stylus body and a second data transmitter fixedly position on the opposite end of the stylus body, each of the first and second data transmitters devices being associated with a unique identification code, and each of the first and second data transmitters comprising a radio frequency transmitter adapted to transmit the unique identification code associated with that data transmitter and other information that can be used for range measuring;
surface having a first, second and third measuring devices each being fixedly positioned proximate to a each of a first, second and third corner of the writing surface, the first, second and third range measuring devices comprising a radio frequency receiver adapted to receive from each of the first and second data transmitters the unique identification code associated therewith and other information that can be used measure the range between that range measuring device and the data transmitter associated with a received unique identification code.

16. The system of claim 15, further comprising:
third data transmitter fixedly positioned away from the first and second data transmitters in the stylus body, the third data transmitter being located in a position away from a line formed between the first and second data transmitters, the third data transmitter being associated with a unique identification code, and comprising a radio frequency transmitter adapted to transmit the unique identification code associated with the third data transmitter and other information that can be used for range measuring; and
wherein each a radio frequency receiver is further adapted to receive from the third data transmitter the unique identification code associated therewith and other information that can be used measure the range between that range measuring device and the third data transmitter.

17. The system of claim 16, further comprising:
processor adapted to receive a plurality of temporally spaced range measurements from each of the first, second and third surface-based range measuring devices, and to use those range measurements to determine a set of changes in position, orientation and rotation of the stylus with respect to the surface.

18. A system comprising:
surface having a first, second and third data transmitters fixedly positioned proximate to each of a first, second and third corner of the surface, each of the first, second and third data transmitters being associated with a unique identification code, and each of the first, second and third data transmitters comprising a radio frequency transmitter adapted to transmit the unique identification code associated with that data transmitter and other information that can be used for range measuring;
elongated stylus body having a tip end and an opposite end;
first range measuring device being fixedly positioned fixedly positioned on the tip end of the stylus body;
second range measuring device being fixedly position on the opposite end of the stylus body;
third range measuring device being fixedly position away from the first and second data transmitters on the stylus body, the third range measuring device being located in a position away from a line formed between the first and second range measuring device;
each of the first, second and third range measuring devices being associated with a unique identification code, and each of the first, second and third range measuring devices comprising a radio frequency receiver adapted to receive from each of the first, second and third data transmitters the unique identification code associated therewith and other information that can be used measure the range between that range measuring device and the data transmitter associated with a received unique identification code.

19. The system of claim 18, further comprising:
processor adapted to receive a plurality of temporally spaced range measurements from each of the first, second and third range measuring devices, and to use those range measurements to determine a set of changes in position, orientation and rotation of the stylus with respect to the surface.

* * * * *